United States Patent Office 3,440,371
Patented Apr. 22, 1969

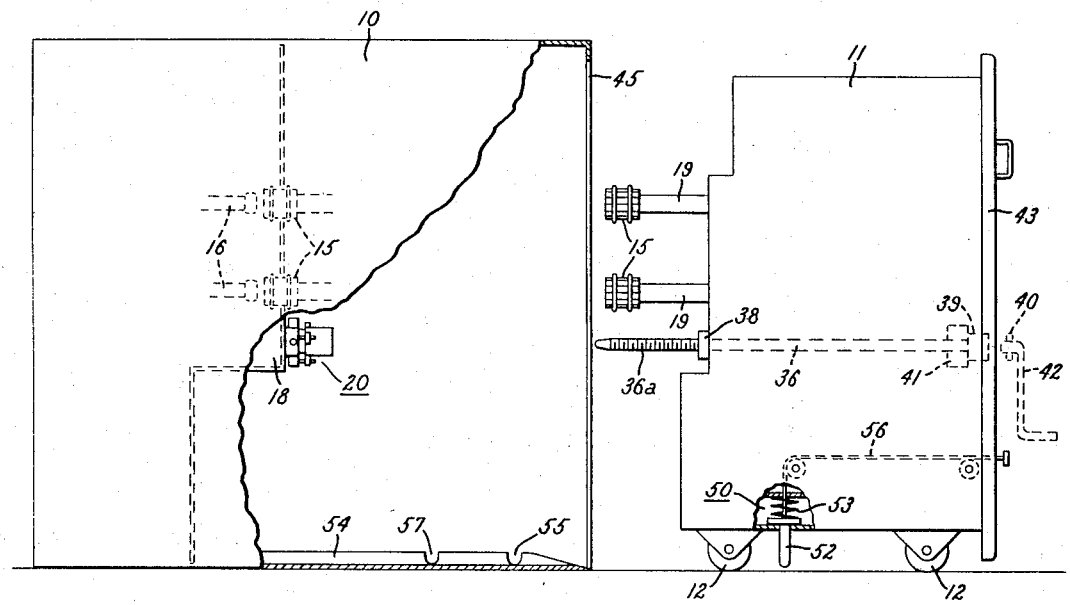
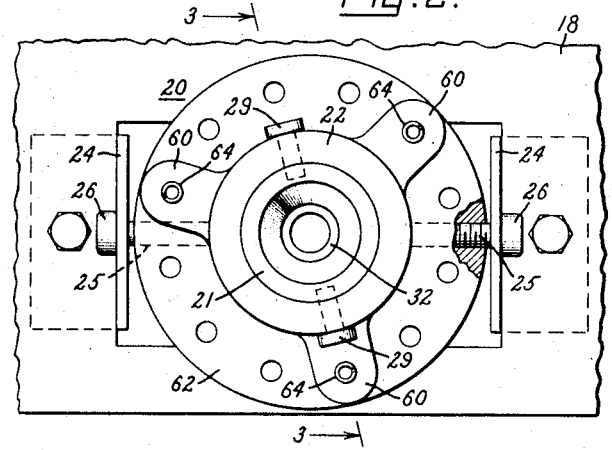
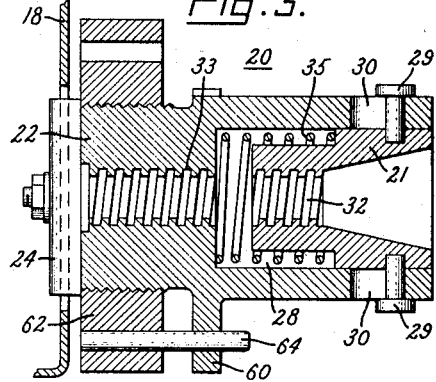
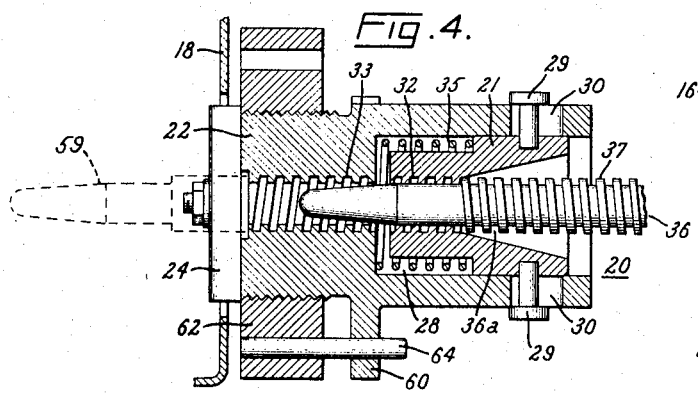
INVENTORS:
PHILIP C. NETZEL.
WILLIAM E. STEWART
BY William Freedman
ATTORNEY

3,440,371
JACKSCREW TYPE RACKING MECHANISM FOR DRAWOUT SWITCHGEAR
Philip C. Netzel, Milmont Park, and William E. Stewart, Ardmore, Pa., assignors to General Electric Company, a corporation of New York
Filed Mar. 10, 1967, Ser. No. 622,160
Int. Cl. H01h 9/20, 33/46
U.S. Cl. 200—50           7 Claims

ABSTRACT OF THE DISCLOSURE

Racking mechanism for driving a movable switchgear unit into and out of a fully-inserted position inside an enclosure. Comprises a spring-mounted nut supported on the enclosure and a jackscrew disengageable from the nut and supported on the movable switchgear unit for meshing with the nut to provide racking force when the jackscrew is rotated. An additional nut positively connected to the enclosure also meshes with the jackscrew to lock the movable switchgear unit in place when in or near its fully-inserted position.

Background of the invention

This invention relates to electric switchgear of the drawout type and, more particularly, relates to a racking mechanism for forcing a movable switchgear unit into and out of a connected position within an enclosure.

The invention is particularly concerned with a racking mechanism of the type that relies upon disengageable threaded parts for forcing the switchgear unit into and out of its connected position. A difficulty which has been present in certain prior mechanisms of this type is that the threads of the disengageable parts could be rather easily damaged by impacts resulting from movement of the switchgear unit toward its connected position while the threaded parts were still out of mesh. For reducing the possibility of damage to the threads of such a racking mechanism, it has been proposed in Patent 2,885,502, Eichelberger et al., assigned to the assignee of the present invention, that one of the threaded parts be mounted for limited lost-motion travel, so that it can yield if impacted by the other threaded part during insertion of the movable switchgear unit.

The lost-motion mounting of the Eichelberger patent has provided satisfactory protection against damage to the threads of the racking mechanism, but its presence has detracted from the ability of the racking mechanism to lock the switchgear unit in its fully-inserted position. No such locking problem is present if Eichelberger's racking mechanism is left undisturbed after having moved the switchgear unit into its fully connected position. But if the racking mechanism is reversely operated by a small amount following full insertion, the above-described lost-motion connection will permit slack to develop in the racking mechanism which impairs the locking ability of the racking mechanism.

Summary

An object of the present invention is to provide a racking mechanism of the disengageable thread type which not only has threads protected against damage from impacts but also is capable of effectively locking the switchgear unit in its fully-inserted position.

Another object is to provide a racking mechanism of this type in which reverse operation of the racking mechanism following full insertion of the switchgear unit is immediately effective to initiate withdrawal movement of the switchgear unit without requiring any lost motion to be taken up.

Brief description of drawings

For a better understanding of the invention, reference may be had to the following description taken in conjunction with the accompanying drawings, wherein:

FIG. 1 is a side elevational view, partly in section, showing switchgear apparatus embodying one form of the invention. This figure depicts the movable switchgear unit in a position where it is fully withdrawn from its enclosure.

FIG. 1a is an enlarged sectional view of the contacts of the switchgear apparatus depicted in FIG. 1.

FIG. 2 is an enlarged end view of nut structure forming a part of the racking mechanism.

FIG. 3 is a sectional view taken along the line 3—3 of FIG. 1.

FIG. 4 is a sectional view similar to FIG. 3 showing the parts of the racking mechanism at a particular point during the insertion operation.

Description of preferred embodiment

Referring now to FIG. 1, the switchgear apparatus shown therein comprises a stationary enclosure 10 and a removable, or drawout, switchgear unit 11 which is mounted on suitable wheels 12. The wheels 12 allow the removable unit 11 to be rolled horizontally from the withdrawn position shown to a fully-inserted position inside the enclosure. In the fully-inserted position a set of socket type contacts 15 carried by the movable switchgear unit 11 fully engage a set of plug-type stationary contacts 16 suitably supported on the enclosure 10. The position of the contacts 15 just prior to their engaging the stationary contacts 16 during an insertion operation is shown in dotted line form in FIG. 1. Mating pairs of contacts 15 and 16, when fully engaged, form the terminals for a power circuit (not shown) extending through the switchgear unit and suitably controlled thereby.

The contacts 15 and 16 are shown in detail in FIG. 1a, where they are depicted in their fully-engaged position. Each movable socket contact 15 is shown formed as a longitudinally-segmented tube encircled by a pair of garter springs 17. The segments forming each tube are pivotally mounted on a conductive stud 19 carried by the movable switchgear unit. The right hand garter spring 17 forces the segments into high pressure engagement with the stud 19 and the left hand garter spring forces the segments into engagment with the stationary contact 16. Each of the stationary contacts 16 is shown formed with an enlarged head 16a over which the tubular socket contact 15 slides when moving toward or away from its fully-connected position shown. To provide the desired contact pressures when the contacts are in their fully-engaged position of FIG. 1, the garter spring 17 must be relatively strong; and as a result, considerable force is required to force the movable contacts into or out of their position of full engagement.

To aid in driving the switchgear unit 11 into its fully-inserted position, a racking mechanism 20 is provided. This racking mechanism comprises two colinearly-disposed internally threaded nuts 21 and 22 mounted on the stationary enclosure 10. Outer nut 22 is mounted on the stationary enclosure by means of a pair of spaced-apart L-shaped brackets 24, which are fixed to a wall 18 of the enclosure and are disposed at opposite sides of the nut, and aligned pivot pins 25 fixed to nut 22 and journaled in brackets 24. These pivot pins 25 are preferably bolt-like members threaded into radially-extending holes in the outer nut 22 and having heads 26 that prevent appreciable radial shifting of nut 22. The pivot pins 25 allow the nut 22 to pivot by a limited amount about the axis of the pivot pins, thereby compensating for slight misalignment between the parts of the racking mechanism, as will soon be explained. The pins 25 serve also to fix the outer nut 22 against longitudinal movement relative to the enclosure and against rotational movement about its central axis.

The other or inner nut 21 of the racking mechanism is mounted within a recess 28 provided at the right hand end of the outer nut 22. For mounting inner nut 21 within the recess 28, a pair of radially extending pins 29 secured to inner nut 21 and extending through slots 30 in the outer nut 22 are provided. This pin and slot connection permits the inner nut 21 to slide longitudinally within the recess 28 through a limited amount of travel in a direction parallel to the longitudinal axis of nut 21, but it prevents nut 21 from rotating about its longitudinal axis with respect ot the outer nut. A compression spring 35 biases the inner nut 21 to the right so that it occupies the position shown in FIG. 3 when the switchgear unit 11 is withdrawn. The two nuts 21 and 22 have aligned bores, both of which are provided with internal threads, respectively designated 32 and 33.

The racking mechanism further includes a rod or jackscrew 36 which is carried by the movable switchgear unit 11 and is rotatably mounted thereon. The rod or jackscrew 36 extends in a direction parallel to the path of movement of switchgear unit 11 and at its left hand end 36a has external threads 37 which are adapted to mesh with the internal threads 32 of nut 21. When these threads 32 and 37 are in mesh and the inner nut 21 is positioned with its mounted pins 29 at the front end of slots 30, rotation of the jackscrew causes threads 32, 37 to shift the jackscrew longitudinally, and this longitudinal movement is utilized to rack the switchgear unit into and out of its fully-connected position.

For utilizing longitudinal movement of jackscrew 36 to produce this racking action, suitable coupling means is provided for mounting the jackscrew on the movable switchgear unit 11 in a manner which permits rotation of the jackscrew relative to the switchgear unit but prevents longitudinal movement of the jackscrew relative to the switchgear unit 11. Referring to FIG. 1, this coupling means comprises a suitable journal 41 fixed to the movable switchgear unit and thrust collars 38 and 39 fixed to the jackscrew at its opposite ends. The jackscrew is rotatably mounted in journal 41 at its right hand end. Collar 39 bears against journal 41 to prevent longitudinal movement of the jackscrew to the left with respect to switchgear unit 11, and collar 38 bears against a portion of the switchgear unit to prevent movement of the jackscrew to the right with respect to the switchgear unit 11.

To aid in rotating jackscrew, or rod, 36, the collar 39 is suitably slotted to receive a pin 40 carried by a crank 42 or similar tool which can be suitably operated to transmit rotary forces through such pin to the jackscrew. A protective panel 43 attached to the outer end of the movable switchgear unit 11 has an opening therein to allow for access to the slotted collar 39.

Assume now that the switchgear unit 11 is in its withdrawn position of FIG. 1 and that it is desired to move it into its fully-inserted position. This is accomplished by first aligning the switchgear unit 11 with the illustrated opening 45 in the enclosure 10 and rolling it to the left. When a predetermined amount of such movement to the left has taken place, the left hand end of the jackscrew 36 engages the inner nut 21, thereafter moving the inner nut 21 to the left against spring 35. The slot 30 will permit a predetermined amount of such movement of nut 21 to the left before pins 29 reach the end of the slots. But before pins 29 can reach the ends of slots 30, a stop mechanism 50 on the movable switchgear unit 11 comes into play to temporarily prevent further movement of the switchgear unit to the left. The position of the parts at the instant that the stop mechanism comes into play is depicted by the solid lines of FIG. 4.

As is schematically shown in FIG. 1, the stop mechanism 50 comprises a blocking plunger 52 and a compression spring 53 biasing the plunger downwardly. The lower end of this blocking plunger slides along the upper surface of a cam 54 as the switchgear unit moves to the left. Cam 54 is located in a position intermediate the sides of the switchgear unit. When the switchgear unit has been moved to the left a predetermined distance, the blocking plunger 52 is forced by spring 53 into a locking notch 55 on cam 54, which blocks further movement of the switchgear unit to the left until the plunger 52 is deliberately lifted from notch 55. For lifting the plunger from notch 55, suitable means, schematically shown as a cable 56, is operable from the front of the switchgear unit. When cable 56 is pulled by the operator, the plunger 52 is lifted from the locking notch 55 against the spring 53, and the operator is free to begin racking the switchgear unit toward its connected position.

The locking notch 55 is so positioned that it permits the movable switchgear to be pushed to the left sufficiently to cause the left hand end of the jackscrew 36 to engage the nut 21. Further movement of the switchgear unit to the left forces the inner nut 21 to the left against spring 35, as pointed out hereinabove; but before the inner nut can reach the limit of its leftward travel, the plunger 52 drops into notch 55 to temporarily prevent further leftward movement of the switchgear unit.

The yieldable spring mounting of the inner nut 21 serves the important function of protecting the threads of this nut and the jackscrew from being damaged by the impact resulting when the nut and jackscrew engage while the switchgear unit is being moved toward its fully inserted position. The stop mechanism 50 also serves to protect these threads since it prevents the nut 21 from striking a stationary stop while being pushed toward the left ahead of the threaded end of the jackscrew 36.

Assume now that the switchgear unit is so positioned that its plunger 52 engages the notch 55. Further movement of the switchgear unit to the left is effected by first lifting plunger 52 and then rotating jackscrew 36. Initial rotation of jackscrew 36 while the switchgear unit is so positioned will result in the nut 21 being automatically fed onto the jackscrew and moving to the right. The jackscrew will not move longitudinally during this initial jackscrew rotation, but after a predetermined amount of such jackscrew rotation, the pins 29 on nut 21 will have reached the front end of slots 30; and thereafter rotation of the jackscrew will cause the jackscrew to move longitudinally into the nut 21. As the jackscrew moves longitudinally to the left, it carries the movable switchgear unit along with it. At an intermediate position of the switchgear unit, the plunger 52 falls into another notch 57 which marks the "test" position of the switchgear unit. Movement of the switchgear unit beyond this test position is effected by again lifting the plunger 52 and continuing rotation of jackscrew 36. This continued rotation of jackscrew 36 continues the leftward movement of the switchgear unit 11, eventually causing movable contacts 15 of the switchgear unit to pass through the dotted line position of FIG. 1 and into their fully-connected position of FIG. 1a. When the collar 38 on the jackscrew moves into contact with the outer end of nut 21, the movable switchgear unit is fully inserted, and no additional inserting movement can occur.

Before the contacts 15 on the movable switchgear unit engage contact 16, the threads of jackscrew 37 begin meshing with the threads 33 of the outer nut 22. Accordingly, when the switchgear unit is in its fully-inserted position, the jackscrew is threaded into both nuts 21 and 22 and occupies the dotted line position 59 of FIG. 4. The meshing relationship between the threads on nut 22 and the jackscrew threads 37 provides a positive coupling between the jackscrew and the enclosure 10 when the jackscrew unit is in or near its fully connected position, as will soon be explained.

For racking the switchgear unit out of its fully-inserted position, the operator rotates the jackscrew 36 in a reverse direction to that used for the inserting operation. Such reverse rotation immediately produces longitudinal movement of the jackscrew 36 to the right due to the meshing relationship then present between the threads of the jackscrew and the threads of stationary nut 22. Accordingly, the switchgear unit immediately moves to the right as the jackscrew is reversely rotated.

It will be apparent from the above that our racking mechanism is capable of effectively locking the movable switchgear unit 11 in its fully inserted position. Any reverse rotation of the jackscrew immediately produces withdrawal motion of the switchgear unit. Such withdrawal motion will operate a suitable interlock device (not shown) to trip open the circuit breaker or switch (not shown) inside the movable switchgear unit. Had the jackscrew been meshing with only the yieldably mounted nut 21 when this reverse rotation occurred, then the reverse rotation would not immediately produce withdrawal motion of the switchgear unit; it would merely move the nut 21 to the left, developing a lost-motion space between pins 29 and the right hand end of slots 30. This would, in effect, develop slack in the racking mechanism which would impair the ability of the racking mechanism to lock the switchgear unit in its fully-inserted position. No such slack is developed in our mechanism since a positive coupling between the outer nut 22 and the jackscrew 26 is maintained despite such reverse rotation of the jackscrew.

After the switchgear unit has been moved sufficiently to the right to disengage contacts 15 and 16, the jackscrew threads 37 move out of mesh with threads 33 of outer nut 22. The threads 37 still, however, engage the threads on inner nut 21, and further rotation of the jackscrew therefore feed the inner nut 21 to the left until pins 29 engage the left hand end of slot 30. During this period no longitudinal motion of the jackscrew occurs, but when the pins 29 engage the left hand end of slots 30, further rotation of jackscrew 36 moves the jackscrew longitudinally in the inner nut 21 forcing the switchgear unit further to the right. When the jackscrew together with the switchgear unit 11 has been moved sufficiently to the right, the threads 37 of the jackscrew disengage from the inner nut, thereby permitting complete withdrawal of the movable switchgear unit.

To compensate for slight misalignments in the nut structure 21, 22 and the jackscrew 36 which could interfere with the jackscrew properly entering the nut structure during a racking-in operation, the previously described pivot pins 25 are provided. These pivot pins permit the nut structure 21, 22 to rock slightly about the axis of the pivot pins to insure correct positioning of the nut for proper entry of the jackscrew 36.

To provide an adjustment which determines the position of the movable switchgear unit 11 when it is fully engaged, the outer nut 22 is preferably made in two parts. One part 60 is the main body of the nut, and the other part is a ring 62 threaded on to the main body. The main body 60 of the nut 22 can be rotated with respect to ring 62 to adjust its axial position with respect to ring 62 and thus with respect to enclosure 10. When a suitable adjustment of this type is made, a locking pin 64 is inserted into aligned holes of the two parts 60 and 62 of the nut to maintain the desired adjustment. This adjustment can be used to properly determine the position of the front 43 of the switchgear unit when the collar 38 engages the outer face of nut 21.

While we have shown and described a particular embodiment of our invention, it will be obvious to those skilled in the art that various changes and modifications may be made without departing from our invention in its broader aspects; and we, therefore, intend in the appended claims to cover all such changes and modifications as fall within the true spirit and scope of our invention.

What we claim as new and desire to secure by Letters Patent of the United States is:

1. Electric switchgear comprising an enclosure (10), a switchgear unit (11) movable into and out of said enclosure, and racking mechanism (36, 21, 22) for moving said switchgear unit into and out of a fully-inserted position within said enclosure, said racking mechanism comprising:
   (a) a first threaded part (21),
   (b) means (22, 25, 24) for mounting said first threaded part on said enclosure comprising means (28) permitting a limited amount of longitudinal motion of said first threaded part relative to said enclosure and means (29, 30) blocking rotational movement of said first threaded part about its longitudinal axis relative to said enclosure,
   (c) a rod (36) rotatably mounted on said movable switchgear unit and having a second threaded part (36a) for meshing with the threads (32) of said first part to move said rod longitudinally in response to rotation thereof while said first threaded part is blocked from moving longitudinally,
   (d) coupling means (38, 39) for transmitting longitudinal movement of said rod to said switchgear unit (11) for driving said switchgear unit toward or away from said fully-inserted position in response to rotation of said rod,
   (e) said first and second threaded parts being disengaged when said switchgear unit is withdrawn a predetermined distance from its fully-inserted position,
   (f) spring means (35) for biasing said first threaded part (21) into an extended position where it will engage said second threaded part (36a) when said switchgear unit is returned toward said fully-inserted position from a withdrawn position, said spring means yielding to permit longitudinal movement of said first threaded part (21) away from said extended position when engaged by said second threaded part (36a) during movement of said switchgear unit toward said fully-inserted position,
   (g) and positive coupling means (33, 22, 24, 25) for forcing said movable switchgear unit to move away from its fully-inserted position when said rod (36) is rotated while the threads of said first and second parts are in mesh,
   (h) said positive coupling means comprising a third threaded part (22) substantially fixed against longitudinal movement relative to said enclosure and against rotational movement about the axis of said second threaded part,
   (i) said third part (22) having threads (33) meshing with the threads (37) of said second threaded part (36a) when said switch unit is in or near said fully-connected position.

2. The switchgear apparatus of claim 1 in which the threads (37) of said second part mesh with the threads (33) of said third part only after said rod (36) has been rotated by a predetermined amount while the threads (32, 37) of said first and second parts mesh.

3. The apparatus of claim 1 in which said first threaded part (21) and said third threaded part (22) are internally threaded nuts and said second threaded part (36) is an externally threaded jackscrew.

4. The apparatus of claim 1 in which said first (21) and third (22) threaded parts are colinearly disposed nuts and said second threaded part is a jackscrew (36) having threads meshing with the threads of both of said nuts.

5. The switchgear apparatus of claim 1 in which:
   (a) said first and third threaded parts (21 and 22) are internally threaded nuts and said second threaded part (36) is a jackscrew for meshing with said nuts, and
   (b) said first threaded part (21) is mounted on said third threaded part (22) for limited longitudinal motion with respect to said third threaded part.

6. The apparatus of claim 5 in combination with means (24, 25) for mounting said third part (22) on said enclosure (10) for limited rocking motion about a transverse axis to facilitate alignment thereof with said second threaded part.

7. The apparatus of claim 1 in combination with stop means (50) for blocking inserting movement of said movable switchgear unit (11) before said first threaded part (21) encounters any stationary structure as it (21) is displaced from said extended position by engagement with said second part (36).

References Cited

UNITED STATES PATENTS 3,217,211  11/1965  Norden _____ 317—103

ROBERT K. SCHAEFER, *Primary Examiner.*

M. GINSBURG, *Assistant Examiner.*

U.S. Cl. X.R.

317—103